United States Patent [19]

Nakajima et al.

[11] 4,443,490

[45] Apr. 17, 1984

[54] MAGNETIC RECORDING MEDIUM

[75] Inventors: Kaoru Nakajima; Kunio Kobayashi; Yoshiaki Hisagen, all of Miyagi, Japan

[73] Assignee: Sony Corporation, Tokyo, Japan

[21] Appl. No.: 442,845

[22] Filed: Nov. 18, 1982

Related U.S. Application Data

[62] Division of Ser. No. 174,871, Aug. 4, 1980, abandoned.

[30] Foreign Application Priority Data

Aug. 6, 1979 [JP] Japan .................................. 54-100145
Aug. 8, 1979 [JP] Japan .................................. 54-101133

[51] Int. Cl.$^3$ .............................................. B05D 3/06
[52] U.S. Cl. ......................................... 427/44; 427/130
[58] Field of Search ........................... 427/44, 128, 130

[56] References Cited

U.S. PATENT DOCUMENTS 3,104,983  9/1963  Tarwater et al. ...................... 427/36
3,216,846  11/1965  Hendricx et al. .................... 427/130
3,749,592  7/1973  Gaske et al. ........................... 427/44

*Primary Examiner*—John H. Newsome
*Attorney, Agent, or Firm*—Hill, Van Santen, Steadman & Simpson

[57] ABSTRACT

A magnetic recording medium carrying a magnetic layer thereon, the magnetic layer primarily composed of binder and magnetic powder, wherein the binder is composed of an acrylic compound having a plurality of unsaturated bonds in its molecule and a thermoplastic resin in a weight ratio of 80:20 to 20:80, and is hardened under irradiation.

6 Claims, No Drawings

MAGNETIC RECORDING MEDIUM

This is a division of application Ser. No. 174,871, filed Aug. 4, 1980, now abandoned.

BACKGROUND OF THE INVENTION

1. Field of the Invention

The present invention relates to a magnetic recording medium, in which a magnetic recording layer primarily composed of magnetic powder and binder is formed on a non-magnetizable support, and particularly to binder of the magnetic recording layer.

2. Description of the Prior Art

The magnetic recording medium generally comprises a magnetic layer primarily composed of magnetic powder and binder formed on a non-magnetizable support such as a polyethylene terephthalate film. In the prior art, the binder is formed by combining various thermoplastic and thermosetting resins. Further, to improve the mechanical strength of coated layer, various hardening agents such as polyisocyanate compounds are used together with these resins so that a three-dimensional cross-linked structure may be formed by thermosetting. However, such thermosetting method has demerits, such as an insufficientmechanical strength of coated layer, a difficulty in controlling the degree of hardening, and a shorter pot life of the magnetic paint prepared.

A method that hardens the magnetic layer under irradiation has recently been noticed. For example, as disclosed in the Japanese Patent Publication No. 28649/1972, a method is known wherein to improve the wearproof performance of coated magnetic layer and reduce voids thereof a magnetic paint that uses binder formed by mixing an allyl monomer and liquid thermoplastic high molecular prepolymer is coated on a base and then irradiated for polymerization and hardening of these monomer and prepolymer. However, it is noted that in this method the above objects can be achieved only under heavy irradiation since the allyl compound is less reactive. Therefore, as far as an irradiation system of limited dosage capacity is used, the film coating speed is necessarily delayed, which is unfavorable for industrial application. Further, it is still necessary to improve the performance of coated magnetic layer in durability.

OBJECTS AND SUMMARY OF THE INVENTION

Accordingly, it is an object of the present invention to provide an improved magnetic recording medium.

It is another object of the present invention to provide a magnetic recording medium that shows a favorable wearproof performance.

It is another object of the present invention to provide a magnetic recording medium carrying a magnetic layer thereon that is characterized by high adherence to the base.

It is still another object of the present invention to provide a magnetic recording medium that is free of any peeling off of the magnetic layer coated thereon.

It is a further object of the present invention to provide a magnetic recording medium wherein the coated magnetic layer provides a highly flat surface.

According to one aspect of the present invention, there is provided a magnetic recording medium carrying a magnetic layer thereon, the magnetic layer primarily being composed of a binder and magnetic powder, wherein said binder is composed of an acrylic compound having a plurality of unsaturated bonds in its molecule and a thermoplastic resin in a weight ratio of 80:20 to 20:80, and is hardened under irradiation.

DESCRIPTION OF THE PREFERRED EMBODIMENTS

According to the present invention, the acrylic compound as mentioned above has double bonds between pairs of adjacent carbon atoms that are sensitive to radicals generated under irradiation, so that it undergoes a so-called radical polymerization reaction as its double bonds are attacked by an initiator, which is some dissociation products, primarily free radicals formed either from the acrylic compound itself or from the thermoplastic compound under irradiation, being hardened to form a complicated three-dimensional cross-linked network structure with the latter compound included therein. Therefore, even at a reduced radiation dose, a desirable magnetic layer can be formed that is characterized by a favorable high wearproof performance, low voids and also high durability. Further, the presence of a suitable amount of the thermoplastic resin component will improve the performance of coated magnetic layer in adherence to the base, wearproof property, and resistance to solvents.

To achieve these remarkable performance effects, the acrylic compounds must have at least two double bonds of the above mentioned type in individual molecules. This is because an acrylic compound that has only a single double bond can form only a linear polymer, which means a failure in achieving the desirable objects. The mixing ratio of the acrylic compound and thermoplastic resin must be limited in the range as aforementioned, for use of a superfluous quantity of acrylic compound that exceeds the given range will provide a hard and frangile magnetic layer that adheres less favorably to the base while the use of a superfluous quantity of thermoplastic resin that exceeds the range will cause poor hardening of the layer and therefore lead to an increase in the powder dropping (peeling-off) or, for example, squeaks of the tape because the friction coefficient is not reduced.

In the present invention, the flatening or mirror surface treatment, namely, the calender treatment of the magnetic layer can be made after the binder has been partially cross-linked. Namely, the magnetic recording medium can be manufactured in a process that comprises a steps of forming a magnetic layer of a mixture primarily composed of both binder sensitive to radiations and magnetic powder, of subjecting this magnetic layer to preliminary irradiation for partial hardening of the binder, of treating the surface of the magnetic layer to finish flat, and of subjecting the flat-surfaced magnetic layer to full irradiation to sufficiently harden the binder component.

According to this method, the magnetic layer of mixture, for example, magnetic coating is partially hardened under preliminary irradiation and then treated for flatening, for example, by a calender treatment, so that before the flatening treatment the magnetic layer of mixture has already been hardened to a prescribed hardness adhering to the base. As a result, the method is free of such troubles as powder dropping or peeling-off of coated film. Further, after flatening treatment, the film is fully irradiated for hardening. Therefore, the magnetic layer can be finished in mirror surface and the wearproof performance thereof can be improved.

The acrylic compound usable in the present invention is preferably a reactive acrylic oligomer or oligoacrylate that contains a plurality of double bonds, and preferably three or more double bonds. Actual examples of such acrylic compound are, for example, polyacrylates and polymethacrylates (here the prefix "poly" refers to dimers or higher polymers) of polyhydric alcohols such as polyethylene glycohol, polypropylene oxide, polybutylene oxide, polycyclohexene oxide, polyethylene oxide, polypropylene oxide, polystyrene oxide, polyoxetane, polytetrahydrofuran, cyclohexanediol, xylylenediol, di-(β-hydroxyethoxy)benzene, glycerin, diglycerin, neopentylglycol, trimethylolpropane, triethylolpropane, pentaerythritol, dipentaethythritol, sorbitan, sorbitol, butanediol, butanetriol, 2-butene-1,4-diol, 2-n-butyl-2-ethyl-propanediol, 2-butyn-1,4-diol, 3-chloro-1,2-propanediol, 1,4-cyclohexanedimethanol, 3-cyclohexane-1,1-dimethanol, decalindiol, 2,3-dibromo-2-butene-1,4-diol, 2,2-diethyl-1,3-propanediol, 1,5-dihydroxy-1,2,3,4-tetrahydronaphthalene, 2,5-dimethyl-2,5-hexanediol, 2,2-dimethyl-1,3-propanediol, 2,2-diphenyl-1,3-propanediol, dodecanediol, mesoerythritol, 2-ethyl-1,3-hexanediol, 2-ethyl-2-(hydroxymethyl)-1,3-propanediol, 2-ethyl-2-methyl-1,3-propanediol, heptanediol, hexanediol, 3-hexene-2,5-diol, hydroxybenzyl alcohol, hydroxyethylresorcinol, 2-methyl-1,4-butanediol, 2-methyl-2,4-pentanediol, nonanediol, octanediol, pentanediol, 1-phenyl-1,2-ethanediol, propanediol, 2,2,4,4-tetramethyl-1,3-cyclobutanediol, 2,3,5,6-tetramethyl-p-xylene-α,α'-diol, 1,1,4,4-tetraphenyl-1,4-butanediol, 1,1,4,4-tetraphenyl-2-butyn-1,4-diol, 1,2,6-trihydroxyhexane, 1,1'-bi-2-naphthol, dihydroxynaphthalene, 1,1'-methylene-di-2-naphthol, 1,2,4-benzenetriol, biphenol, 2,2'-bis(4-hydroxyphenyl)butane, 1,1-bis(4-hydroxyphenyl)-cyclohexane, bis(hydroxyphenyl)methane, catechol, 4-chlororesorcinol, 3,4-dihydroxyhydrocinnamic acid, hydroquinone, hydroxybenzyl alcohol, methylhydroquinone, methyl-2,4,6-trihydroxybenzoate, phloroglucinol, pyrogallol, resorcinol, glucose, α-(1-aminoethyl)-p-hydroxybenzyl alcohol, 2-amino-2-ethyl-1,3-propanediol, 2-amino-2-methyl-1,3-propanediol, 3-amino-1,2-propanediol, N-(3-aminopropyl)-diethanolamine, N,N'-bis-(2-hydroxyethyl)piperazine, 2,2-bis(hydroxymethyl), 2,2',2"-nitrilotriethanol, 2,2-bis(hydroxymethyl)propionic acid, 1,3-bis(hydroxymethyl)-urea, 1,2-bis(4-pyridyl)-1,2-ethanediol, N-n-butyldiethanolamine, diethanolamine, N-ethyldiethanolamine, 3-mercapto-1,2-propanediol, 3-piperidino-1,2-propanediol, 2-(2-pyridyl)-1,3-propanediol, triethanolamine, α-(1-aminoethyl)-p-hydroxybenzyl alcohol, 3-amino-4-hydroxyphenyl, and sulfones. In view of the availability, the more preferred of these acrylic and methacrylic esters are ethylenedimethacrylate, ethyleneglycol diacrylate, diethylengeglycol dimethacrylate, polyethyleneglycol diacrylate, pentaerythritol triacrylate, pentaerythritol dimethacrylate, dipentaerythritol pentaacrylate, glycerin triacrylate, diglycerin dimethacrylate, 1,3-propanediol diacrylate, 1,2,4-butanetriol trimethacrylate, 1,4-cyclohexanediol diacrylate, 1,5-pentanediol diacrylate, neopentylglycol diacrylate, triacrylic acid ester of trimethylolpropane with ethylene oxide added, and so on.

Further acrylamides and methacrylamides that are also usable for the acrylic compound are methlenebisacrylamide, and methylenebismethacrylamide, as well as ethylenediamine, diaminopropane, diaminobutane, pentamethylenediamine, hexamethylene, bis(2-aminopropyl)amine, diethylenetriaminediamine, heptamethylenediamine, octamethylenediamine, polyamine having amide bonds interrupted by foreign atoms, polyacrylamides and polymethacrylamides of cyclic polyamines [for example, phenylenediamine, xylyenediamine, β-(4-aminophenyl)ethylamine, diaminobenzoic acid, diaminotoluene, diaminoanthraquinone, and diaminofluorene], and so on.

Further, N-β-hydroxyethyl-β-(methacylamide)ethyl acrylate, N,N-bis(β-methacryloxyethyl)acrylamide, allyl methacrylate, and other compounds having two or more unsaturated bonds that can undergo addition polymerization can also be preferably used for the acrylic compound used in this invention.

Another acrylic compounds that are usable are polyester copolymers of various degrees of polymerization that can be produced by reacting trimethylolpropane monoacrylate, hexanediol, and adipic acid. In this reaction, diacrylate of an aliphatic polyol such as pentaerythritol, or diacrylate of an alicyclic compound diglycidyl ether, or the like can be used instead of trimethylolpropane monoacrylate while hexanediol can be replaced with ethylene glycol, propylene glycol, 1,3-propanediol, 1,4-butanediol, 1,5-pentanediol, neopentyl glycol, diethylene glycol, dipropylene glycol, 2,2,4-trimethyl-1,3-pentanediol, 1,4-cyclohexanedimethanol, ethylene oxide added product and propylene oxide added product of bisphenol A, ethylene oxide added product and propylene oxide added product of hydrogenated bisphenol A, polyethylene glycol, polypropylene glycol, polytetramethylene glycol, and so on. Triols and tetraols such as trimethylolethane, trimethylolpropane, glycerin, and pentaerythritol may also be added in small quantities. Further, adipic acids can be replaced with aromatic dicarboxylic acids such as terephthalic acid, isophthalic acid, orthophthalic acid and 1,5-naphthalic acid; aromatic hydroxycarboxylic acids such as p-hydroxybenzoic acid and p-(hydroxyethoxy)-benzoic acid; aliphatic dicarboxylic acids such as succinic acid, azelaic acid, sebacic acid and dodecane-dicarboxylic acids. In this case, if aromatic and aliphatic carboxylic acids are used in combination, their molar ratio is preferably between 50/50 and 100/0 and use of terephthalic acid in a quantity that accounts for 30% or more of the carboxylic acids used on molar basis is preferred. Tri- and tetracarboxylic acids such as trimellitic acid, trimethinic acid and pyromellitic acid can be added in a small quantity. Further, the acid component such as adipic acid can be replaced with an aromatic or aliphatic diisocyanate such as tolylene diisocyanate, when the copolymerization product thereof is polyurethane. A preferable blend ratio of the acrylates and polyols as heretobefore cited is between 80/20 and 10/90, and between 40/60 and 5/95 when the acrylate is monoacrylate and diacrylate, respectively.

The thermoplastic resin used in this invention is not limited to special types, thermoplastic polyurethane such as Estane 5702 (supplied by B. F. Goodrich Co.), thermoplastic linear polyester such as Vylon (supplied by Toyobo Co., Ltd.), and the like being applicable.

In the present invention, the magnetic layer can be formed by coating the base in conformity to a conventional method of prior art. To irradiate the magnetic layer formed by coating, an ionizing radiation such as electron beam, neutron beam or γ-rays is used preferably at a dose between 1 and 10 Mrad, and more preferably at a dose between 2 and 7 Mrad, with the radiation energy thereof being preferably set at 100 KeV or higher. The above radiation dose will be enough to start the aforementioned radical reaction for polymerization.

In case the coated magnetic layer is subjected to a preliminary irradiation, the preferable radiation dose is between 0.1 and 3 Mrad while preferably 1 to 10 Mrad and more preferably 2 to 7 Mrad is used for full irradiation after the calender treatment.

For the magnetic powder that can be used to form the magnetic layer according to the present invention, $\gamma$-$Fe_2O_3$, mixed crystal of $\gamma$-$Fe_2O_3$ and $Fe_3O_4$, cobalt-doped $\gamma$-$Fe_2O_3$ or $Fe_3O_4$, $CrO_2$, barium ferrite, ferrimagnetic alloys (for example, Fe-Co, Co-Ni, Fe-Co-Ni, Fe-Co-B, Fe-Co-Cr-B, Mn-Bi, Mn-Al, and Fe-Co-V), iron nitride, and the like may be cited. Further, the magnetic layer may contain aluminum oxide, chromium oxide or silicon oxide as a reinforcing agent, squalane as a lubricant, carbon black as an antistatic agent, and lecithin as a dispersing agent. To form the magnetic layer, its constituent materials are dissolved in an organic solvent to prepare a magnetic paint with which the base is coated. For the solvent of magnetic paint, ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol acetate; monoethyl ether; glycol ethers such as ethylene glycol dimethyl ether and ethylene glycol monoethyl ether; dioxane; aromatic hydrocarbons such as benzene, toluene and xylene; aliphatic hydrocarbons such as hexane and heptane; nitropropane; and so on may be cited. The base to coat the magnetic paint thus prepared therein is made of a non-magnetizable material, such as a polyester (for example, polyethylene terephthalate); polyolefin (for example, polypropylene), cellulose derivative (for example, cellulose, triacetate or cellulose diacetate), polycarbonate, polyvinyl chloride, polyimide, polyamide, polyhydrazide, metal (for example, aluminum or copper) or paper.

The invention will be described further, by way of example.

EXAMPLE 1

First, a magnetic paint was prepared in the following composition:

| | |
|---|---|
| $\gamma$-$Fe_2O_3$ | 400 parts by weight |
| Oligoacrylate (M-8030 from Toa Gosei Kagaku Co., 3 double bonds, M.W. 2000) | 50 parts by weight |
| Estane 5702 (thermoplastic polyurethane from B. F. Goodrich Co.) | 50 parts by weight |
| Squalane (lubricant) | 3 parts by weight |
| Lecithin (dispersing agent) | 1 part by weight |
| Methyl ethyl ketone (solvent) | 600 parts by weight |
| Methyl isobutyl ketone (solvent) | 600 parts by weight |

A piece of polyethylene terephthalate base film $16\mu$ thick was coated with this magnetic paint so that the coated paint may be $4\mu$ thick after drying. The dried paint coating was calender-treated and then irradiated with 3 Mrad of electron beam under an acceleration voltage of 200 kV.

Some characteristic performances of the magnetic tape obtained by the present example were compared to those of conventional examples in the following table:

| | Rectangular ratio Rs | Wear*** |
|---|---|---|
| Example 1 of this invention | 85% | 0.6 mg |
| Conventional example 1* | 77% | 1.2 mg |
| Conventional example 2** | 83% | 0.8 mg |

*For the conventional example 1, the base was coated with a paint whose formulation was the same as the one used in example 1 but for an addition of 20 PHR of an isocyanate compound (Desmodure L). An irradiation with an electron beam was omitted.
**The conventional example 2 was the same as the example 1 but for use of an allyl monomer instead of an acrylate.
***The wear was measured as a quantity of dust that dropped after the magnetic tape was run 10 times over a lapping tape.

The above results show that in the present example since the acryl oligomer and thermoplastic resin are blended in proper quantities the filling percentage of magnetic powder is improved to increase the value of Rs enough and further even a low dose of electron beam irradiation hardens the magnetic layer favorably improving the wearproof property of coated layer. Further, in the present example, a low dose of electron beam is enough for irradiation, so that the line speed of process may be increased, which is another merit beside the improved wearproof property as aforementioned for industrial application.

EXAMPLE 2

First, a magnetic paint was prepared in the following formulation:

| | |
|---|---|
| $\gamma$-$Fe_2O_3$ | 400 parts by weight |
| Oligoacrylate (M-8030 from Toa Gosei Kagaku Co., 3 double bonds, M.W. 2000) | 50 parts by weight |
| Estane 5702 (thermoplastic polyurethane from B. F. Goodrich Co.) | 50 parts by weight |
| Squalane (lubricant) | 3 parts by weight |
| Lecithin (dispersing agent) | 1 part by weight |
| Methyl ethyl ketone (solvent) | 600 parts by weight |
| Methyl isobutyl ketone (solvent) | 600 parts by weight |

A piece of polyethylene terephthalate base film $16\mu$ thick was coated with this paint so that the coated paint may be $4\mu$ thick after an orientation of magnetic powder and then drying. The dried coating was subjected to a preliminary irradiation with 1 Mrad of electron beam under an acceleration voltage of 200 kV to partially harden the binder component in the coated layer. The film was passed between an elastic roll and steel roll, with the magnetic layer in contact with the latter roll, for a calender treatment at a temperature of 80° C. and under a line pressure of 140 kg/cm (pressure per unit width). Thus, a film that had a magnetic layer whose surface was favorably finished flat was obtained, which showed neither powder dropping nor peeling-off when it was calender treated. Next, the coated layer was fully irradiated with 5 to 8 Mrad of electron beam under an acceleration voltage of 200 kV.

The tape obtained was slit in a certain width and the color noise ratio (C/N) was measured with it, which proved that the surface of magnetic layer was at a very favorable state. Further, the magnetic layer was found to have a desirable hardness and exhibit an excellent wearproof performance.

EXAMPLE 3

Another magnetic paint was prepared in a formulation that was the same as in the example 2 but for use of a copolymer of acrylonitrile and 1,2-butadiene instead of thermoplastic polyurethane. In the same procedure as in the example 2, the above paint was coated, dried, subjected to a preliminary irradiation with an electron beam (200 kV, 1 Mrad), calender treated (80° C., 40 kg/cm, a metal roll and fiber roll used in a pair), and then subjected to a full irradiation with an electron beam (200 kV, 5 to 8 Mrad).

The magnetic tape thus obtained was slit 1 inch wide and the color noise ratio (C/N) was measured with it, which proved a favorable state of the surface of magnetic layer.

REFERENCE EXAMPLE 1

A piece of polyethylene terephthalate base film 16μ thick was coated with a magnetic paint having the same formulation as used in the example 2 so that the coated layer may be 4μ thick after drying. After an orientation of the magnetic powder, the paint was dried to form a magnetic layer. The magnetic layer was irradiated with 5 to 8 Mrad of electron beam under an acceleration voltage of 200 kV and then calender treated at a temperature of 80° C. and under a line pressure of 40 kg/cm. The magnetic tape thus obtained was compared to those in examples 1 to 3 in C/N in the following table:

|  | C/N* |
|---|---|
| Sample 1 | +3 to 5 dB |
| Sample 2 | +3 to 5 dB |
| Sample 3 | +3 to 5 dB |
| Reference example 1 | 0 dB |

*The C/N values for the examples 1 to 3 were estimated with the one for the reference example 1 set to 0 dB.

The table shows that the magnetic layer that was irradiated with an electron beam after a calender treatment or the one that was subjected to a preliminary irradiation and full irradiation with an electron beam before and after a calender treatment, respectively, had a substantially higher C/N estimate and, therefore, a more excellent surface state compared to the magnetic layer that was calender treated after a full irradiation with an electron beam.

What is claimed is:
1. A method of manufacturing a magnetic recording medium which comprises:
   coating a magnetic paint composed of magnetic powder and a binder on a non-magnetic substrate to form a coating layer, said binder containing an acrylic compound having at least two unsaturated bonds per molecule and a thermoplastic resin in a weight ratio of 80:20 to 20:80,
   preliminarily irradiating the coating layer with an ionizing radiation at a dose amount of 0.1 to 3 Mrad;
   subjecting the coating layer to a calender treatment; and
   irradiating the calendered coating layer with an ionizing radiation at a dose amount of from 1 to 10 Mrad to fully cure the coating layer.
2. A method according to claim 1 wherein: the molecular weight of said acrylic compound is 100 to 10,000 per double bond.
3. A method according to claim 1 wherein: the molecular weight of said acrylic compound is 200 to 2,000 per double bond.
4. A method according to claim 1 wherein: said thermoplastic resin is a thermoplastic polyurethane or a thermoplastic polyester.
5. A method according to claim 1 in which: the irradiating is carried out by means of an electron beam.
6. A method according to claim 1 in which: the irradiating is carried out with a radiation energy of at least 100 keV.

* * * * *